United States Patent
Hare

(10) Patent No.: US 8,948,189 B2
(45) Date of Patent: Feb. 3, 2015

(54) SYSTEM AND METHOD FOR SCHEDULING RESERVATION REQUESTS FOR A COMMUNICATION NETWORK

(75) Inventor: Robert Lawrence Hare, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 765 days.

(21) Appl. No.: 12/165,300

(22) Filed: Jun. 30, 2008

(65) Prior Publication Data

US 2009/0252172 A1    Oct. 8, 2009

Related U.S. Application Data

(60) Provisional application No. 61/042,203, filed on Apr. 3, 2008.

(51) Int. Cl.
| | |
|---|---|
| *H04L 12/28* | (2006.01) |
| *H04L 12/54* | (2013.01) |
| *H04L 12/911* | (2013.01) |

(52) U.S. Cl.
CPC ............ *H04L 12/5695* (2013.01); *H04L 47/72* (2013.01); *H04L 47/822* (2013.01); *H04L 47/826* (2013.01); *H04L 2012/2849* (2013.01)
USPC ...................................... 370/395.4; 370/230

(58) Field of Classification Search
USPC ......... 370/236, 232, 480, 329, 345, 235, 254, 370/248, 249, 390; 709/225; 725/78, 133
See application file for complete search history.

(56) References Cited

U.S. PATENT DOCUMENTS

| | | | | |
|---|---|---|---|---|
| 6,111,886 | A  * | 8/2000  | Stewart | 370/438 |
| 6,480,476 | B1 * | 11/2002 | Willars | 370/311 |
| 6,834,194 | B2 * | 12/2004 | Hunzinger | 455/452.2 |
| 7,099,330 | B2 * | 8/2006  | Chiussi et al. | 370/395.4 |
| 7,301,950 | B1 * | 11/2007 | Cheong et al. | 370/395.21 |
| 7,430,209 | B2 * | 9/2008  | Porter | 370/395.4 |
| 7,436,848 | B1 * | 10/2008 | Lewis et al. | 370/462 |
| 7,596,089 | B2 * | 9/2009  | Bi et al. | 370/232 |
| 8,385,938 | B2 * | 2/2013  | Karlsson | 455/453 |
| 8,644,321 | B2 * | 2/2014  | Carlson et al. | 370/395.42 |
| 8,681,711 | B2 * | 3/2014  | Balasubramanian | 370/329 |
| 2003/0223429 | A1 * | 12/2003 | Bi et al. | 370/395.4 |
| 2004/0044771 | A1 | 3/2004 | Allred et al. | |
| 2005/0010664 | A1 | 1/2005 | Hubbard | |

(Continued)

FOREIGN PATENT DOCUMENTS

| | | |
|---|---|---|
| JP | 06-090243 | 3/1994 |
| JP | 2000-196629 | 7/2000 |

(Continued)

*Primary Examiner* — Michael J. Moore, Jr.
(74) *Attorney, Agent, or Firm* — Richard Bachand; Bruce Greenhaus; Sheppard Mullin Richter & Hampton LLP

(57) ABSTRACT

A process for scheduling reservation requests among a plurality of nodes on a network, includes examining a level of network communication activity of a first node to determine whether the first node is active; allocating a reservation request to the first node, but only if the first node is determined to be active; and repeating the process of examining and allocating for one or more subsequent nodes on the network. In one embodiment, the process can utilize thresholds to determine whether a network device is active and the thresholds can be based on, for example, recent network activity for the node being evaluated.

29 Claims, 8 Drawing Sheets

(56) References Cited

U.S. PATENT DOCUMENTS

| | | | |
|---|---|---|---|
| 2005/0111461 A1* | 5/2005 | Khan et al. | 370/395.4 |
| 2005/0281253 A1* | 12/2005 | Veijalainen et al. | 370/363 |
| 2006/0031888 A1* | 2/2006 | Sparrell | 725/78 |
| 2007/0201370 A1* | 8/2007 | Stamoulis | 370/236 |
| 2007/0294410 A1 | 12/2007 | Pandya et al. | |
| 2008/0298241 A1* | 12/2008 | Ohana et al. | 370/235 |

FOREIGN PATENT DOCUMENTS

| | | |
|---|---|---|
| JP | 2005-110166 | 4/2005 |
| WO | WO/00/22837 A2 | 4/2000 |

* cited by examiner

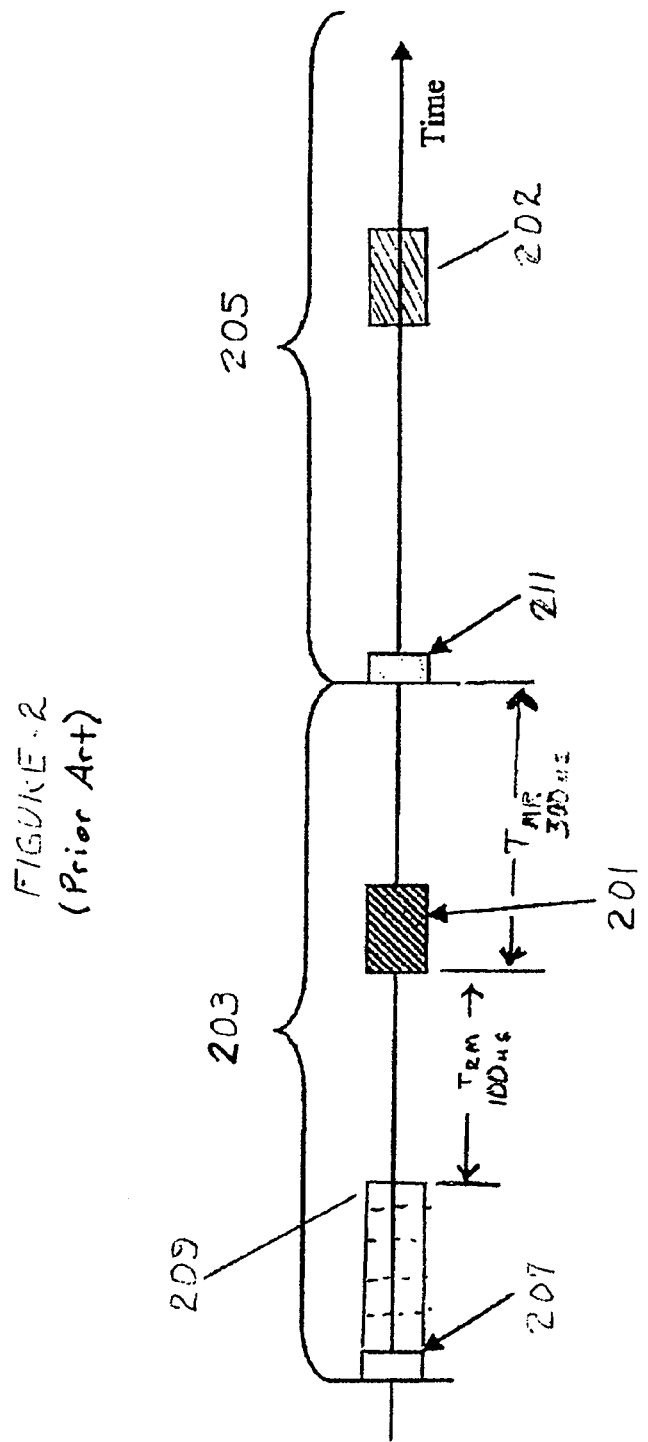

SYSTEM AND METHOD FOR SCHEDULING RESERVATION REQUESTS FOR A COMMUNICATION NETWORK

CROSS-REFERENCE TO RELATED APPLICATIONS

This application claims priority from U.S. Provisional Patent Application Ser. No. 61/042,203 filed Apr. 3, 2008; which is incorporated herein by reference in its entirety.

TECHNICAL FIELD

The present disclosure relates to communication networks, and more particularly, some embodiments relate to heuristic scheduling of reservation requests in a communications network.

DESCRIPTION OF THE RELATED ART

With the many continued advancements in communications and data transfer technology, more and more devices are being introduced in both the consumer and commercial sectors with advanced, high bandwidth communications capabilities. Additionally, advances in processing power and low-power consumption technologies have led to the proliferation of communications capabilities in various products on a widespread basis.

For example, communication networks are now commonplace in many home and office environments. Such networks allow various previously independent devices to share data and other information to enhance productivity or simply to improve their convenience to the user. Against this backdrop, home networking has become central to the evolving home "infotainment" market. Indeed, there is a growing demand for the ability to connect content devices (e.g., televisions, DVD players and recorders, digital cameras, speakers, video cameras, etc.), computing devices, I/O devices, home appliances and modems.

Home entertainment networks are typically provided in one of two topologies. The first is an Access topology, which can be best analogized to a tree structure wherein a base node communicates with nodes in its branches, but branch nodes do not typically communicate with other branches. The second is a Mesh topology in which any node can communicate with any other node in the network. Access topologies are typically found in apartment or office settings where a master node at the 'source' is used to distribute data to a plurality of downstream nodes (e.g., to the various apartments in an apartment building) and the downstream nodes (e.g., apartments) do not need to share content with one another. Mesh topologies, on the other hand, might be more typically found in a home environment where, although there may be a common source of broadband data (e.g., the main cable feed into the home), the homeowners may wish to share content originating from a device in one room with other devices in other rooms in their home.

To address the growing demand for a digital home networking market, a consortium of industry leading companies formed the Multimedia over Coax Alliance (MoCA™). MoCA has provided a technical standard (referred to as "MoCA 1.0") which defines a protocol for distributing digital entertainment over the available bandwidth on coaxial cable previously installed in households for cable or satellite TV service. The initial MoCA standard was approved in February 2006, and routers with built-in MoCA capabilities (i.e., that conform to the MoCA 1.0 standard), MoCA set-top boxes and MoCA adapters followed shortly thereafter. Accordingly, one Mesh topology is defined by the MoCA 1.0 standard.

Architects of these and other networks, and indeed communications channels in general, have long struggled with the challenge of managing multiple communications from various devices across a limited channel. Accordingly, network architects have come up with various solutions to arbitrate disputes or otherwise allocate bandwidth among the various communicating devices, or clients, on the network. Schemes used in well known network configurations such as token rings, Ethernet, and other configurations have been developed to allow sharing of the available bandwidth.

FIG. 1 is a diagram illustrating one example of a home cable network. The example of a home environment illustrated in FIG. 1 also includes examples of equipment and other electronic devices or nodes that might be found in a typical home-networking environment such as the network defined by MoCA 1.0. The network of FIG. 1 includes set-top boxes 111 and televisions (TVs) 110 found in the master bedroom 115, the bedroom 114, and the family room 113. Also, a typical home network might include computing systems such as a desktop computing system 117 and peripherals as illustrated in the den 113, and a laptop computer 118 such as that illustrated in the kitchen 112. Other content devices or network devices might also be provided.

A MoCA network includes a plurality of client nodes, such as TVs 110, set top boxes 111 and computers 117, 118. It should be noted that TVs, 110, set top boxes 111 and computers 117, 118 are configured with a communication device that allows these devices to operate as a client node on the MoCA network. Initially, upon setting up a MoCA network, one of the client nodes is automatically selected to be a network coordinator (NC). For the purpose of establishing a system to allocate network bandwidth, the NC schedules times during which communication occurs over the network. The NC communicates the schedule to each client node in "Media Access Packets" (MAPs). Each MAP is a packet of information. One MAP is sent by the NC during each "MAP cycle".

FIG. 2 is a timing diagram that illustrates the timing relationship between Maps 201, 202 and Map cycles 203, 205. The MAP cycle 205 is defined as the communication activity on the channel under the control of the previously sent MAP 201. Accordingly, the MAPs 201 schedules all of the communication activity for the next MAP cycle 205 (only one such "next MAP cycle" 205 is shown in FIG. 2). It should be noted that the next MAP 202 is sent during the next MAP cycle 205 under the scheduling control of the previous MAP 201. Accordingly, MAPs 201, 202 determine the following information for each packet to be sent in the next MAP cycle 205: i) packet start time; ii) packet length; iii) source node; and iv) destination node(s).

One particular type of packet that the MAP 201, 202 is responsible for scheduling is an RR 207, 209, 211. Six such RRs are shown in the first MAP cycle 203 of FIG. 2, starting with the first RR 207 and ending with the last RR 209. One RR 211 is shown in the second MAP cycle 205. RRs 207, 209, 211 are sent by client nodes to indicate that the client node has packets that it wishes to send and thus to request that the NC schedule a time during a subsequent MAP cycle when the client node can send those packets. Accordingly, when a client node has information to transmit, the client node must first wait for the NC to allocate a time when the client node can send an RR 207, 209, 211. Once the NC has allocated a time during which the client node can sent an RR 207, 209, 211, the client node communicates the RR 207, 209, 211 to the NC at the time allocated (i.e., at the packet start time and for the packet length indicated by the MAP 201, 202).

The RR 207, 209, 211 allows the client node to communicate to the NC that the client node has data packets it wishes to send. Furthermore, the RR 207, 209, 211 indicates the associated destination node(s), packet length, packet priority and so on for those data packets. The NC uses this information to schedule additional times during which the client node can transmit those additional data packets it wishes to send. The NC then communicates that schedule by generating and transmitting the MAP 201 for the next MAP cycle 205.

According to conventional MoCA methodologies, the designated NC schedules RRs for a node based on the time elapsed since that node was last given a reservation, regardless of whether the node actually used that reservation. Even though an RR packet is relatively small (it is approximately 60% the size of a full size data packet) RRs consume about 5% of the network bandwidth.

FIG. 3, which comprises FIGS. 3A and 3B, is a diagram illustrating conventional RR allocations in accordance with the example environment described above. In this conventional application, RRs are allocated to each node on a round-robin basis using various techniques. This algorithm uses the concepts of micro-cycles and macro-cycles as a basis for the round-robin scheduling. A macro-cycle 150 typically refers to the plurality of MAP cycles 165 necessary to ensure that all nodes are considered for an RR opportunity. A micro-cycle typically refers to an individual MAP cycle 165 within the macro-cycle 150. Accordingly, the same reference number "165" will be used when referring to both an individual MAP cycle and a micro-cycle in FIG. 3. FIG. 3 illustrates an example for a network of eight nodes (an NC node and nodes A through G), where the NC allocates five RRs per micro-cycle 165.

In these examples, each macro-cycle 150 is made up of two micro-cycles 165. In these examples, the order in which the RRs are allocated is altered from one macro-cycle to the next to attempt to provide an even distribution of RRs across the participating nodes. Particularly, in the example illustrated in FIG. 3A, the first node to be allocated an RR in a macro-cycle 150b is that node that was the second to be allocated an RR in the previous micro-cycle 165b (i.e., the last micro-cycle 165b of the previous macro-cycle 150a). As illustrated in FIG. 3A, in the first macro-cycle 150a, the RRs are allocated beginning with node A and continuing through nodes B, C, D, E, F and G. Because there are ten RRs per macro-cycle 150, and only seven nodes that require an RR, in the first illustrated macro-cycle 150a, nodes A, B and C each receive a second RR. In the next micro-cycle 150b, node G receives the first RR, since node G was the second node to receive an RR in the previous micro-cycle 165b. Allocation of the RRs continues in order through this second macro-cycle 150b. In the third illustrated macro-cycle 150c, the allocation begins with node F (the second node to receive an RR allocation in the preceding micro-cycle 165d), and the allocation continues likewise.

In the example illustrated in FIG. 3B, the first node at the beginning of a macro-cycle 150 is selected in order continuing from the last node at the end of the previous macro-cycle 150. Accordingly, in the illustrated example, because C was the last node to be allocated an RR in the first macro-cycle 150d, D is the first node to receive a request in the next micro-cycle 150e. Again, in this example, each node is allocated at least one RR in a macro-cycle 150.

In each of these examples, each node is allocated at least one RR in the macro-cycle 150. Consequently, bandwidth is consumed by the RRs associated with each of the nodes whether a node needs to request a reservation or not.

As the RRs for data packets are received by the NC node, they are placed into subqueues. In one embodiment, there are four data priorities (for example, Low, Medium, High, pQoS). Each of the four data priorities has three subqueues, although other quantities of subqueues could be used. Accordingly, in this embodiment there are three subqueues and four priorities yielding 12 queues total. The subqueues of each priority are ordered with the $1^{st}$ subqueue having the highest "value" over the other two subqueues of the same priority. Each subqueue can have a limit on the total number of RRs that accumulate within that subqueue. In addition, there can be a limit to the number of RRs from a particular node. In one example, data packets transmitting VoIP (Voice over Internet Protocol) are assigned a data priority of "High" and one RR per node is allowed in the first subqueue associated with the High data priority. In addition, the subqueues in this example are organized so that as storage elements are filled, those storage elements used by subqueues of lesser value can be reclaimed. For example, the 2nd subqueue of High priority can reclaim storage from the 3rd subqueue of High priority or from any of the subqueues of a lower priority (i.e., Low or Medium priority in this example).

Additionally, constraints can be implemented. Examples of such constraints include: (1) requirements that packets are reclaimed from the end of a given subqueue; (2) requirements that the lowest priority subqueue must be exhausted before moving to the next subqueue; and (3) requirements that subqueues must be reclaimed in a given order, such as from the lowest priority last subqueue to highest priority first subqueue (for example, $3^{rd}$ subqueue of Low priority to $2^{nd}$ subqueue of Low priority, to $1^{st}$ subqueue of Low priority, then to $3^{rd}$ subqueue of Medium priority, and so on). As these examples illustrate, other protocols can be implemented as well.

Together the subqueues for each priority can be limited to a maximum number of RRs if desired, and this can be configurable at startup. For example, the number might typically be constrained to the capacity of the subqueues for that priority. Particular types of RRs, such as requests to reserve time for transmission of link control packets, for example, go into a specialized queue, such as a queue only for link control packets in this particular example. The number of RRs from a given node for a given subqueue can also be configurable, for example at startup. In one embodiment, RRs into the first subqueue can be limited to one or two RRs per node, thereby assuring a level of interactivity for all nodes even if one node is sending large amounts of traffic.

The NC can be configured to accumulate future RRs into the subqueues, and to schedule some or all of the accumulated RRs in the next MAP and if not all, then some or all of the remaining accumulated RRs in future MAPs. In one embodiment, the unscheduled RRs from a given node stay in the subqueues until a future RR is received from that same node. The NC might also be configured to ignore or drop some of the RRs due to resource (data structure capacity) constraints, usurpation by higher priority packets from other nodes, or lack of available scheduling time. Additionally, the NC may replace or replenish its list of packets from a given node by scheduling a new RR for that node.

During reservation processing, the NC goes through all the RRs in the current cycle, and RRs sent by each node for a given priority are placed in the first sub-queue for that priority. In one embodiment, these are added until either the subqueue is full or until a packet-per-node limit (e.g., a limit of 1 or 2 RRs) is reached for that queue. As additional RRs are received, the process repeats for subsequent subqueues for that priority. In accordance with one embodiment, if RRs remain unsatisfied after all the subqueues are considered, these remaining RRs can be discarded. If there is an upper limit on the total number of active RRs and this limit is exceeded, then, in one embodiment, higher priority subqueues can reclaim entries from lower priority subqueues that contain entries.

For a 16 or 32 node network, RRs are typically spread over several MAP cycles. But even spreading RRs over multiple MAP cycles, the marginal cost in terms of bandwidth consumed by the RRs is still high. By way of example, if the cost of a first RR is 50 microseconds out of a 1000 microsecond cycle (50/1000=5%), the true cost of a 6th RR would be (50/750=6.66%). Simply putting a cap on the number of RRs per cycle to keep bandwidth reserved for data, lengthens the macro-cycle and hence increases latency. Accordingly, there is currently a need for a more efficient method and apparatus for scheduling the transmission of data packets over a home entertainment network.

SUMMARY OF THE DISCLOSURE

The presently disclosed method and apparatus is directed toward systems and methods for scheduling the transmission of data packets over a home entertainment network and more particularly to scheduling network access requests for a plurality of network devices of a home entertainment network. In accordance with various embodiments of the disclosed method and apparatus, a dynamic scheduling process schedules reservation requests (RRs) for nodes in the network based on actual or perceived network demand. Particularly, in one embodiment, a scheduling module is provided that looks at node activity and makes scheduling determinations based on node activity. Because of the amount of network bandwidth consumed by RRs, limiting the number of non-productive RRs can enhance the effective throughput and latency characteristics of the network.

For example, in one embodiment, for various nodes being scheduled, the scheduling module looks at recent network activity for a given node and determines whether to schedule an RR for that node based on its activity. As a further example, a network coordinator (NC) can be configured to determine the amount of time elapsed or the number of MAP cycles elapsed since the node's last activity as a metric for determining whether to schedule an RR for that node.

For instance, the NC can be configured to be more lenient in allocating RRs (i.e., schedule more frequent RRs) where a node has had recent communication activity and less lenient (i.e., schedule less frequent RRs) where a node has been inactive for a longer period of time. As another example, an NC can be configured to determine the level of activity of a node and to make a determination as to whether to allocate an RR to the node based on its level of activity.

According to one embodiment of the disclosed method for scheduling RRs among a plurality of nodes on a network, the level of network communication activity of a first node is determined. If the first node is determined to be active, then allocating an RR to the first node. The process is then repeated to determine if a next node is active and allocating an RR only if the next examined node is active.

In accordance with another disclosed embodiment, a network interface or a network device includes: a controller; a device module; memory coupled to the controller; and computer executable program code on a computer readable medium configured to cause the controller to perform the following functions. Determine the level of network communication activity of a first node. If the first node is determined to be active, then allocate an RR to the first node. The process is then repeated for another node in the network to determine if the next node is active. If the next node is active, then an RR is allocated.

In accordance with another disclosed embodiment, the system, method and computer program product can be configured to examine the level of network communication activity of a node by determining the amount of time elapsed or the number of cycles since a previous network transmission by the node. Alternatively, the level of network communication activity of a node is determined based on whether the node has exceeded a threshold. In one embodiment, the threshold is calculated as a function of a quiet time for the node and the amount of time lapsed since the last RR was allocated for the node.

In accordance with yet another disclosed embodiment, the system, method and computer program product allocate an RR to a node in the network regardless of whether that node is active. Additionally, in another embodiment, the system, method and computer program product determine the level of network activity after the nodes have been examined and allocated. An additional RR allocation is then based on network activity.

In still a further embodiment, the system, method and computer program product repeat the process of examining the level of network communication activity for each node of the network and allocate an RR only if a node is active. In one embodiment, nodes that have registered with the system for, or are otherwise identified as getting, parameterized quality of service (pQoS) get an adequate number of reservations to ensure that the quality of service assigned to that node will be achieved.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the invention, which is defined solely by the claims attached hereto.

BRIEF DESCRIPTION OF THE DRAWINGS

One or more various embodiments of a system and method for scheduling reservation requests (RRs) are disclosed herein and described in detail with reference to the following figures. The drawings are provided for purposes of illustration only and merely depict typical or example embodiments of the concepts disclosed herein. These drawings are provided to facilitate the reader's understanding of the disclosed concepts and shall not be considered limiting of the breadth, scope, or applicability of the invention. It should be noted that for clarity and ease of illustration these drawings are not necessarily made to scale.

FIG. 2 is a timing diagram that illustrates the timing relationship between Maps and Map cycles.

FIG. 3, which comprises

The figures are not intended to be exhaustive or to limit the scope of the concepts to the precise form disclosed. It should be understood that the disclosed concepts can be practiced with modification and alteration. Furthermore, the invention shall be limited only by the claims and the equivalents thereof, and while supported by the disclosure provided herein, is not limited to the particular disclosed embodiments.

DETAILED DESCRIPTION

Systems and methods for scheduling network access requests (i.e., reservation requests, hereafter referred to as RRs) for a plurality of network devices are disclosed herein. In accordance with various disclosed embodiments, a dynamic scheduling process schedules RRs for nodes in the network based on actual or perceived network demand. Particularly, in one embodiment, a scheduling module is provided that looks at node activity and makes scheduling determinations based on activity of the node.

From time-to-time, the disclosed method and apparatus is described herein in terms of example environments disclosed above. Descriptions in terms of these environments is provided to allow the various features and embodiments of the disclosed method and apparatus to be portrayed in the context of a particular environment. After reading this description, it will become apparent to one of ordinary skill in the art how the disclosed method and apparatus can be implemented in different and alternative environments, including those with different networking topologies and standards.

A system and method for providing reservation allocations among a plurality of network devices is now discussed in detail.

In accordance with one embodiment of the disclosed method and apparatus, more RRs are allocated to nodes with heavier traffic and fewer RRs are allocated to silent or lighter-traffic nodes. When only a few nodes are transmitting, one embodiment of the disclosed method and apparatus reduces the total number of RRs, thereby freeing for data packets, network bandwidth otherwise consumed by RRs.

Figure 1:
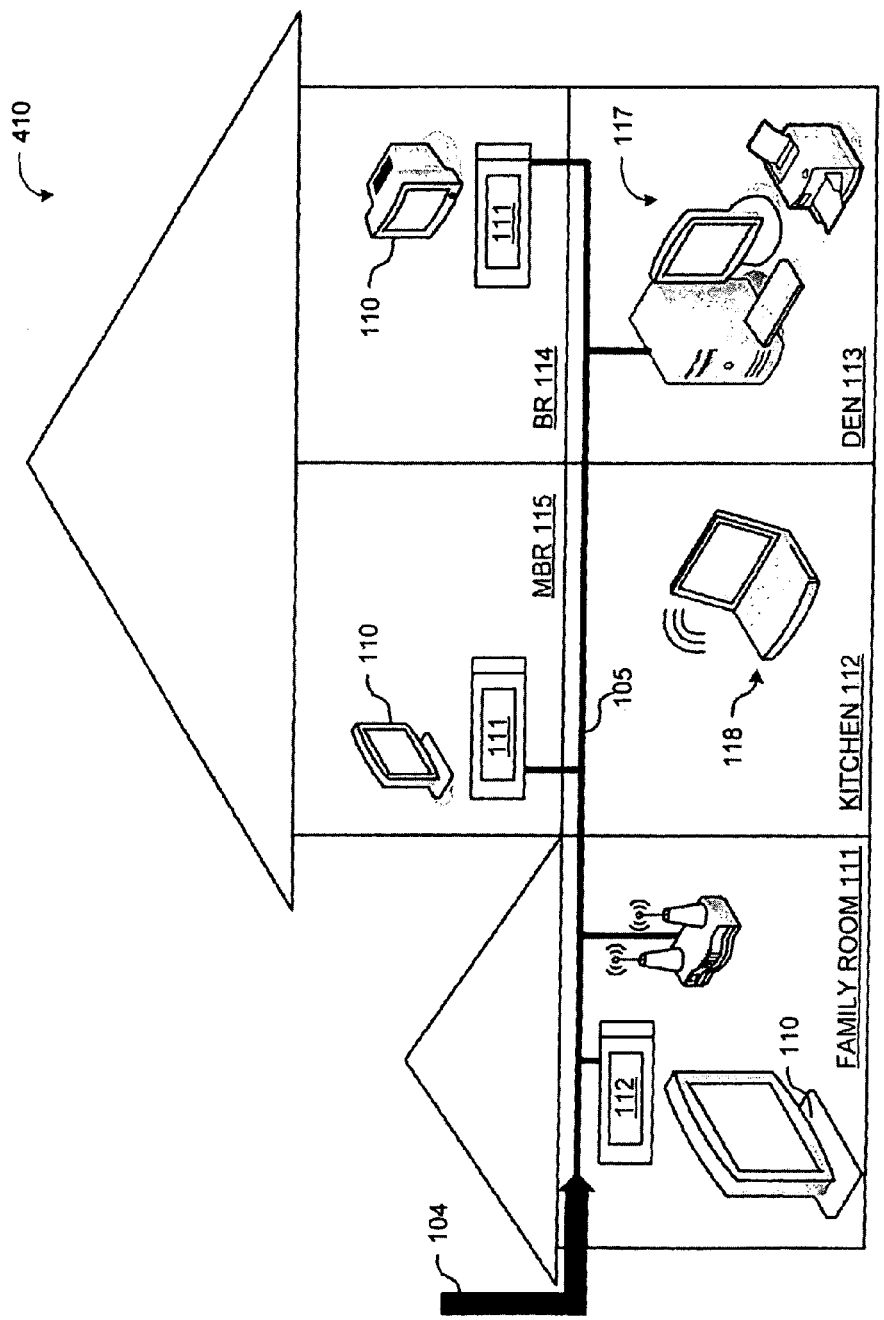
FIG. 1 is a diagram illustrating an example implementation of a home cable network in accordance with one example of an environment for the invention.
Figures 3A, 3B:
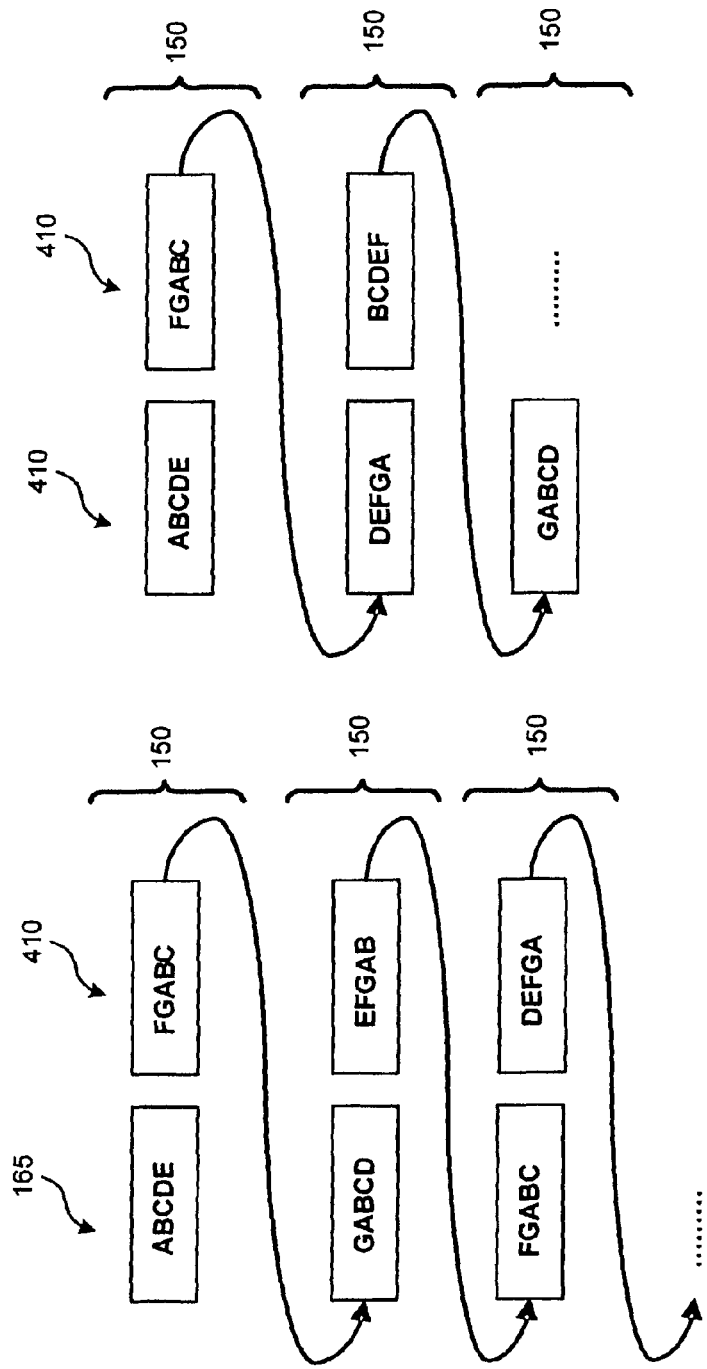
FIGS. 3A and 3B, is a diagram illustrating conventional RR allocations within the one example of an environment.

One embodiment of the disclosed method and apparatus operates by biasing the allocation of RRs in favor of nodes that are actively transmitting application data at the expense of nodes that are transmitting data less frequently or that have not transmitted as recently as other nodes. In one embodiment, the concept of a macro-cycle is still used. However, rather than requiring that all nodes be allocated RRs, as was described with respect to FIG. 3, fewer than all nodes might be allocated RRs in a given macro-cycle. Preferably, all nodes are examined during reservation processing for the possibility of scheduling an RR, but because some nodes might be silent or infrequent transmitters, these nodes might not be allocated RRs in a given macro-cycle, or for a plurality of macro-cycles. As these examples illustrate, there are a variety of algorithms possible for allocating RRs among the nodes in a way that more judiciously allocates them based on actual, anticipated or predicted need.

Figure 4:
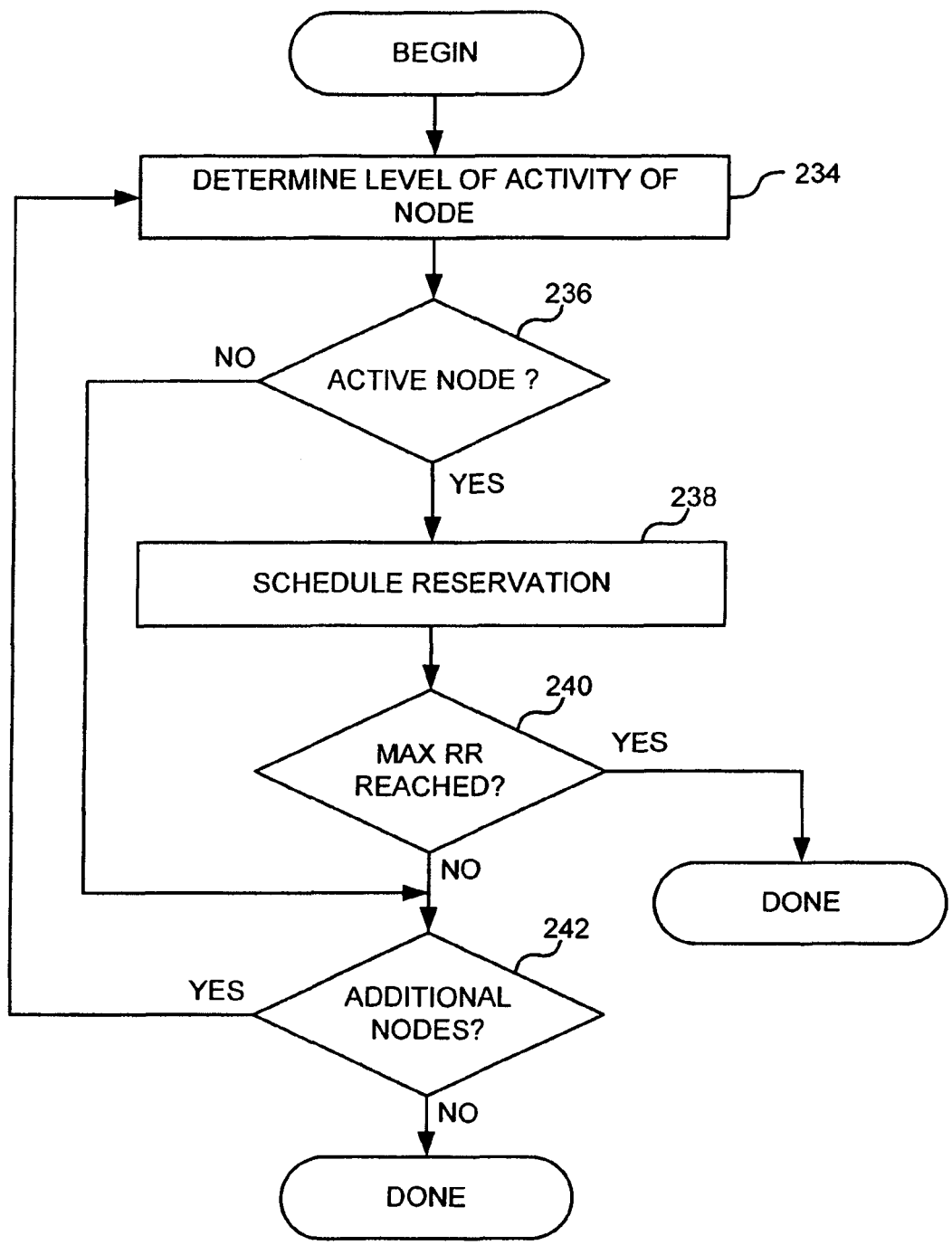
FIG. 4 is a diagram illustrating an example process for dynamic node scheduling in accordance with one embodiment of the disclosed method and apparatus.

FIG. 4 is a diagram illustrating an example process for dynamic node allocation in accordance with one embodiment of the disclosed method and apparatus. Referring now to FIG. 4, in STEP 234 a subject node is examined in a given micro-cycle. In the illustrated example, the node is examined to determine the level of activity conducted by the node. For example, in one embodiment, the system can check to determine whether a given node has been actively transmitting data across the network, how much time (or how many cycles) has elapsed since the node's last transmission, or how frequently such transmissions have been occurring. For example, in many applications, where a node has data to send, it typically has a plurality of consecutive packets to send across the network. Likewise, quiet nodes tend to remain quiet for relatively long periods before the node will have packets to send. In the illustrated embodiment, the level of activity of the node is used to determine, at least in part, whether to schedule an RR for that node. In one embodiment, the node is termed to be active if its level of activity is sufficiently high to warrant scheduling an RR.

If the node being examined is determined to be active, an RR is scheduled for that node. This is illustrated by STEPs 236 and 238. On the other hand, if the node being examined is not active, no RR is scheduled for that node. A variety of techniques can be used to determine whether a node is active for purposes of scheduling an RR. For example, as described in more detail below, threshold levels can be established and used to determine whether a node is active. For example, where a level of activity of a node rises above an established threshold, that node might be said to be active. Thresholds might be fixed or varied depending on, for example, network conditions, network activity and so on.

In one embodiment, thresholds for determining whether a node is active might be predetermined for a given network or network configuration. Such thresholds might also be adjustable. In an alternative embodiment, rather than having a predetermined or established threshold period, a dynamic threshold technique can be configured that looks at the activity of the network or looks at the relative activity among nodes in the network. For example, a NC can examine the activity of a network on an on-going or periodic basis and determine the level of activity in a network, the number of transmitting and silent nodes, and other loading factors. The NC can dynamically set an active threshold based on the level of activity occurring in the network. For example, where a large number of nodes in the network are actively transmitting data, the threshold might be set higher so that the system does not 'over-allocate' RRs to the first nodes examined.

Referring still to FIG. 4, in STEP 240 the process checks to determine whether a maximum number of RRs have been allocated. If so, the process is complete for this cycle. Otherwise, in one embodiment, the process of examining each node in the micro-cycle to determine its level of activity and allocating an RR to each node based on the level of activity continues until either the maximum number of RRs has been reached (STEP 240) or until all the nodes have been examined (STEP 242).

As stated above, one or more thresholds can be established for use in determining whether an examined node is active. In another embodiment, a determination is made as to whether a node is inactive rather than whether a node is active. In that case, an inactive node would not be allocated an RR. In yet another embodiment, two or more thresholds are used with the first threshold indicating whether a node is active and the second threshold indicating whether the node is inactive. If the node is neither clearly active nor clearly inactive, then the decision as to whether to allocate an RR is made based upon other criteria.

Figure 5:
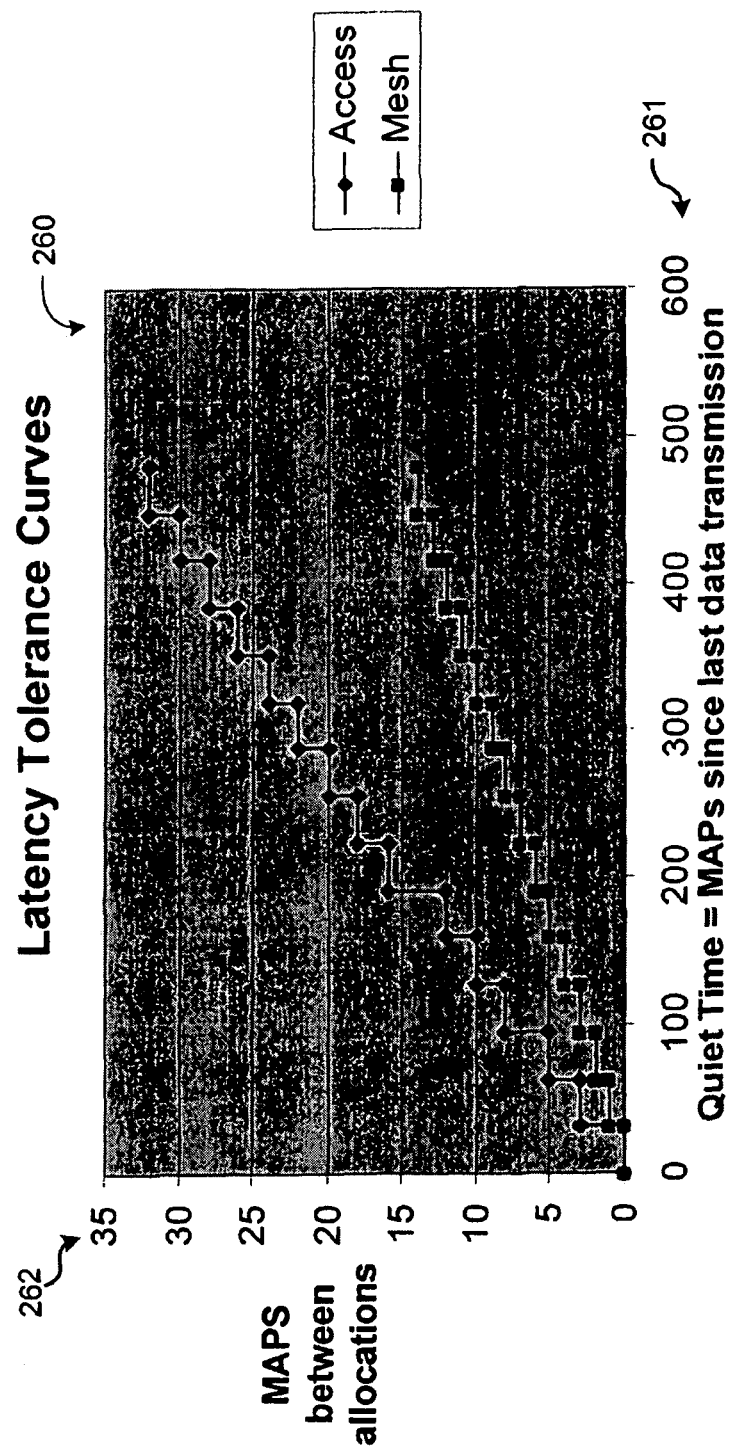
FIG. 5 is a diagram illustrating an example of threshold curves that can be used for scheduling RRs in accordance with one embodiment of the disclosed method and apparatus.

FIG. 5 is a diagram illustrating an example of latency tolerance curves that can be used to determine whether to allocate an RR in accordance with one embodiment of the disclosed method and apparatus. FIG. 5 illustrates two examples of tolerance curves 260; one for an Access topology and one for a Mesh topology. In the illustrated example, the X-axis is the Quiet Time 261, which, in one embodiment, is defined as the number of MAP cycles since a node has transmitted any data packets, and the Y-axis is the number of MAP cycles since the last RR was allocated to the node 262. These curves can be used a measure of how long it should be (e.g., how many MAP cycles should occur) until the NC allocates another RR to the node.

In one embodiment, if the node's state is above the latency tolerance curve illustrated in FIG. 5, it is approved to get an RR allocated in the next scheduling pass. Alternatively, if the node's state is at or below the latency tolerance curve in FIG. 5, an RR is not scheduled for that node. In other words, in this embodiment, the thresholds are determined by the amount of time since the last transmission and the number of MAPs since the last allocation. The illustrated example assumes that devices that are infrequent communicators (or that are in a period of infrequent communication) can tolerate a larger degree of latency than those devices that transmit more frequently (or that are in a period of frequent communication).

In one embodiment, the disclosed method and apparatus can be configured to use a look up table. Table 1 provides one example of a look-up-table to express one example of the relationship in an access topology between the level of activity of a node and the number of RRs that have been allocated over a period of time to that node. In the example of Table 1, a row number (N) provides an array index scaled to an integer from, say, 0-15. One can find the appropriate row number by dividing the number of Quiet Cycles by 32. A MAP cycle is about one millisecond in the example environment. The approximate Quiet Time (T) is in seconds. The row of the table corresponding with N=15 indicates that for a node that has been Quiet for almost one-half second. Row 15 of Table 1 further indicates that such a node would typically not be granted an RR for about 32 cycles. It should be noted that the actual number of cycles might vary due to factors such as, for example, "free-pass" nodes described below. In one embodiment, another factor that might cause the number of cycles to vary is that nodes are considered for reservation only once every macro-cycle. Accordingly, for topologies with 32 nodes, for example, this could delay consideration up to five extra cycles (or 2 extra cycles in topologies with 16 nodes). Note that for the table of this particular example, the latency penalty for a very latent node is only increased by approximately 7% (32 relative to 512).

Because Access topologies accommodate up to 31 client nodes, this example Table is much more aggressive about suppressing reservations than would be desired for 15 client topology, such as a Mesh topology. As this example illustrates, the configuration can be altered to accommodate features of the network configuration such as, for example, the number of nodes and the types of network devices. By using a lookup table, there is flexibility to adjust the algorithm parameters to have configurable options. As would be apparent to one of ordinary skill in the art after reading this, configurations other than look-up tables can be used to control the algorithm and provide adjustability of the parameters.

TABLE 1

| Row Number (N) | Quiet Time (T) | Quiet Cycles | Last Request Threshold |
|---|---|---|---|
| 0  | <.032 | 0-31    | 0  |
| 1  | <.064 | 32-63   | 3  |
| 2  | <.096 | 64-95   | 5  |
| 3  | <.128 | 96-127  | 8  |
| 4  | <.160 | 128-159 | 10 |
| 5  | <.192 | 160-191 | 12 |
| 6  | <.224 | 192-223 | 16 |
| 7  | <.256 | 224-255 | 18 |
| 8  | <.288 | 256-287 | 20 |
| 9  | <.320 | 288-319 | 22 |
| 10 | <.352 | 320-351 | 24 |
| 11 | <.384 | 352-383 | 26 |
| 12 | <.416 | 384-415 | 28 |
| 13 | <.448 | 416-447 | 30 |
| 14 | <.480 | 448-479 | 32 |
| 15 | ≥.480 | 480-... | 32 |

Note, that in the illustrated example, the longer the time elapsed since the last transmission on the network, the more cycles the device is asked to wait before it is allocated an RR. In effect, in such an implementation, less frequent communicators are asked to wait longer between allocations. Also note, that in the illustrated example, if a node is granted an RR, and subsequently requests a data transmission in response to that RR, the node is granted another RR in the next cycle in which it is considered. Accordingly, another way to view the example tolerance curves is that they can be used to define an incremental latency based on historic activity of the node.

Figure 6:
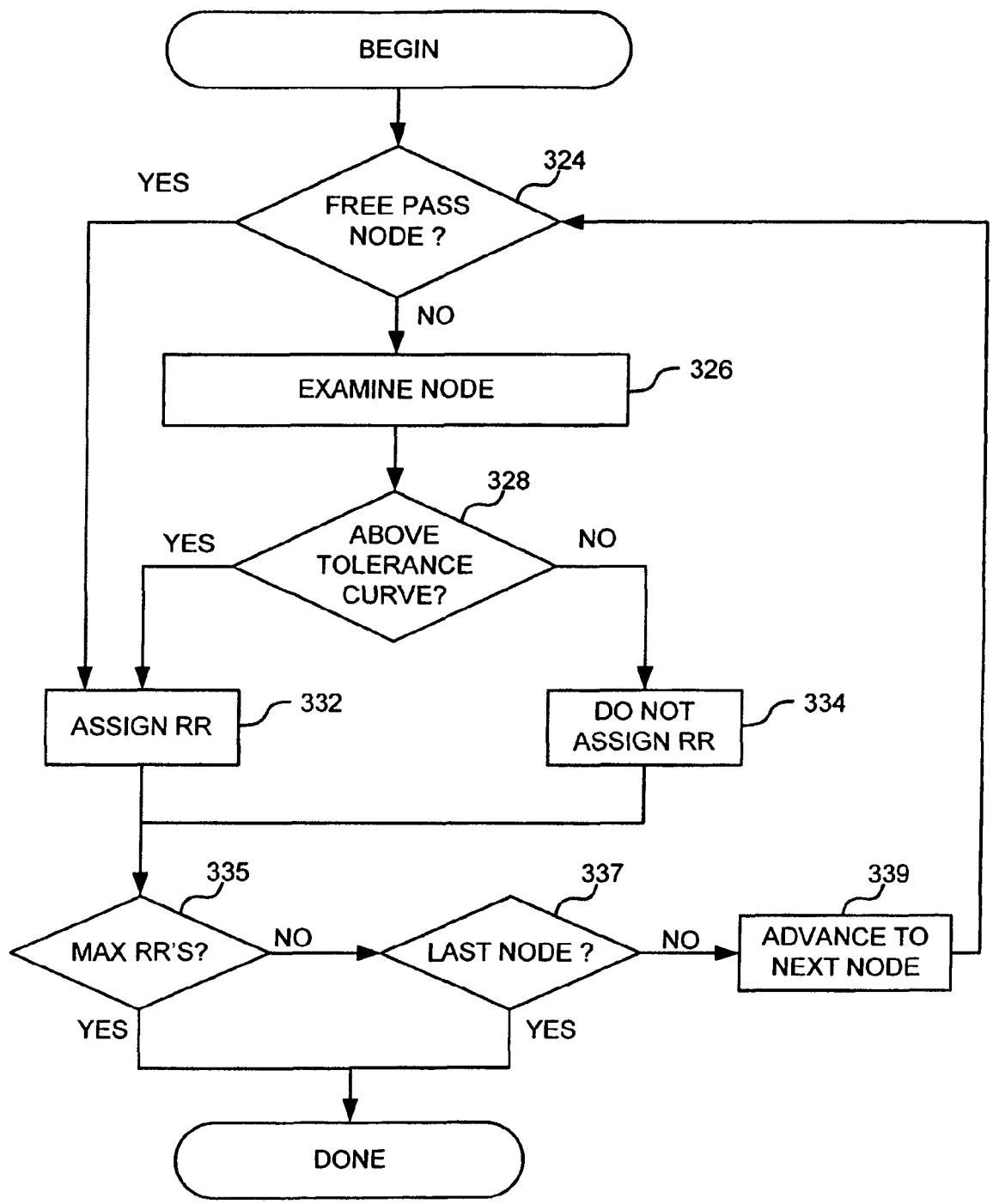
FIG. 6 is a diagram illustrating an example process for dynamic RR scheduling in accordance with one embodiment of the disclosed method and apparatus.

FIG. 6 is a diagram illustrating an example process for dynamic RR scheduling in accordance with one embodiment of the disclosed method and apparatus. Particularly, the example illustrated in FIG. 6 examines a node to determine whether it is above or below a tolerance curve (such as, for example, tolerance curves 260) when deciding to schedule an RR. Additionally, the embodiment illustrated in FIG. 6 follows a process of always allocating an RR to at least one node (i.e., the "free-pass" node) in each micro-cycle to ensure that at least one RR is scheduled per micro-cycle. Such an implementation might be appropriate where, for example, the reception of RRs wakes up a thread to process the packets and the next MAP is generated in the same thread when the last RR is processed. Alternative embodiments do not require one RR per micro-cycle. For example, a timer interrupt or other mechanism can be implemented to wake up the MAP generation thread.

Referring now to FIG. 6, the process begins by examining a first node in the macro-cycle as described above with reference to FIG. 4. However, in this illustrated example, in order to ensure that at least one RR is scheduled per micro-cycle, a given node in each micro-cycle is designated as getting a "free pass" by having an RR allocated to that node regardless of its level of activity. Accordingly, in STEP 324, it is determined whether the node is a "free-pass" node and if so, an RR is allocated to that node in STEP 332 regardless of its level of activity, or regardless of where it falls in relation to the designated tolerance curve. In one embodiment, the first node in each micro-cycle is designated as the free pass node, however, other embodiments can be implemented wherein a node different from the first node is, or a plurality of nodes are, designated as the free-pass node.

The "free pass" is one way to guarantee at least one RR in every micro-cycle. Where a given node in each macro-cycle gets a free pass (e.g., the first node), nodes may be allocated RRs more often than FIG. 3 would suggest. If subsequent micro-cycles are required to complete the macro-cycle, another node might get a "free pass." A node that follows an active node, therefore, might be more likely to get scheduled in such an embodiment. One alternative to providing a free pass would be to perform a normal scanning of nodes, and if no active nodes are found, scheduling either the most appropriate (for example, most active) node, first node, or other identified node.

In STEP 326, the next node is examined to determine whether it is above the established tolerance curve. As previously described, if the node is above the established tolerance curve (or threshold) an RR is allocated to that node. If it is not above the tolerance curve, an RR is not allocated. This is illustrated by STEPs 328, 332 and 334. In STEP 335 the process checks to determine whether a maximum number of RRs have been allocated. If so, the process is complete for this cycle. Otherwise, as illustrated by STEPs 337 and 339, the process is repeated for another node in the macro-cycle to determine whether RRs should be allocated.

In the example environment of a MoCA network, it may take one or more micro-cycles before all nodes have been checked and the macro-cycle ends. Preferably, in this environment, between one and five RRs should be scheduled per micro-cycle. However, the system can be implemented such that the NC is configured to coordinate a different number of RRs depending on activity on the network. As one example, the system can be configured to count the number of nodes that were scheduled in a given macro-cycle, and this value can be viewed as a measure of system idleness. For a system that has only a few active nodes, fewer RRs will be sent per cycle and more data time can be made available on the network, reducing the latency for active nodes. For example, it may be desirable to reallocate the other time slots (that would otherwise be used for RRs) to data packets, thereby increasing the throughput of the network.

In one embodiment, the largest number of RRs per micro-cycle is set to be:

$$\text{max\_RR\_per\_micro-cycle} = 4 + (\text{previous\_actual\_RR\_per\_macro-cycle}/8).$$

Accordingly, in this embodiment, the system can have from 4 to 7 RRs per micro-cycle, Of course, other parameters can be used based on network parameters and desired operational effects. In real use scenarios for an Access network, it is noted that the tendency is for the number of RRs per micro-cycle to tend towards 4 and a macro-cycle is only 1 or 2 actual micro-cycles. So in practice, each active node is scheduled approximately every other micro-cycle. In addition, when using this methodology for 16 node Mesh networks with typical RRs per micro-cycle of 3 to 5, the effect will be to trade off reservations of quiet nodes for more network bandwidth and/or shorter time between RRs for active nodes.

In Access Networks, it is often assumed that there are a large number of nodes in the network and the concept of macro-cycles is utilized. In some ways, a macro-cycle might include the nodes shown in the example model in FIG. 3A; in other words, the ordering of nodes in a macro-cycle might change over time. An Access network might, for example, schedule alternate cycles to arrange coverage for all the nodes over multiple macro-cycles. The final micro-cycle in a macro-cycle may tend to be fairly short as the nodes are exhausted. In Mesh Networks, with a smaller number of nodes, the concept of a macro-cycle might more likely be de-emphasized.

Figure 7:
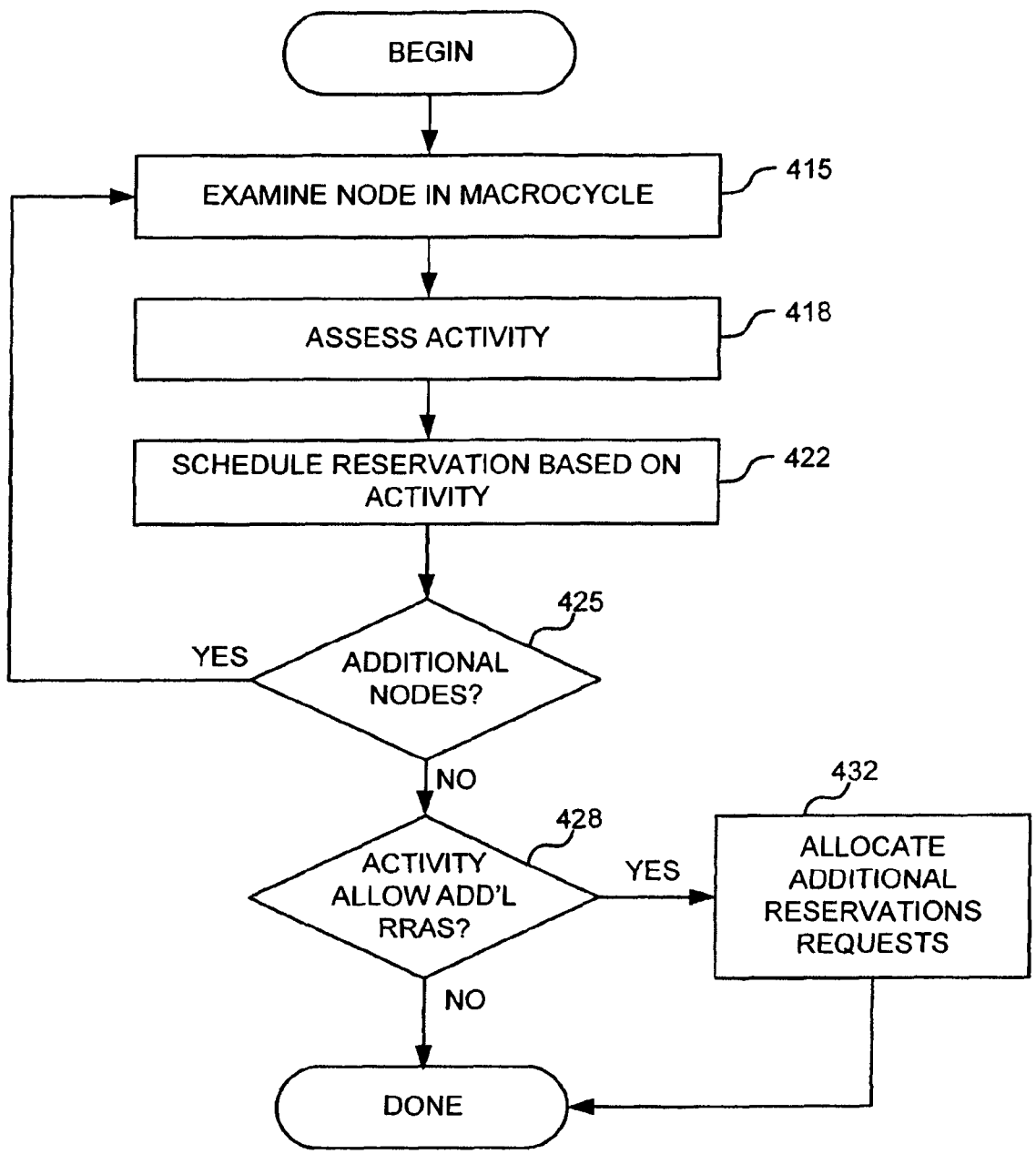
FIG. 7 is a diagram illustrating another example of RR allocation in accordance with one embodiment of the disclosed method and apparatus.

FIG. 7 is a diagram illustrating another example of RR allocation in accordance with one embodiment of the disclosed method and apparatus. Particularly, FIG. 7 illustrates one example where additional RRs can be allocated based on network activity. Referring now to FIG. 7, the process in this example scenario begins with allocation of RRs to network nodes based on their activity. This is illustrated by STEPs 415, 418, 422 and 425. For example, in one embodiment, such allocation can be accomplished using the techniques set forth and described above. As discussed in this document, in one embodiment, where fewer than all otherwise available RRs are allocated, the available time slots might be reallocated to data communications activity. However, in alternative embodiments, the remaining slots might be allocated to other nodes in the network or a combination of allocation and reallocation might be provided.

The embodiment illustrated in FIG. 7 is one in which the activity of the network is examined and evaluated to determine whether network activity is such that the network can adequately accommodate additional RRs. Accordingly, in STEP 428, after all the nodes have been examined and the allocation has been performed, the NC examines the communication activity of the network to determine current loading. If the activity on the network is light enough that additional transmission slots can be accommodated, one or more additional RRs are allocated to one or more other nodes in the network. This is illustrated by STEP 432.

For example, in one embodiment, where network activity is light, the tolerance curve or other established threshold can be lowered and the unallocated nodes reexamined with these new metrics in mind. If a previously unallocated node now falls above the new threshold, an RR can be allocated to that node. This process can be performed for each previously remaining node in the network. As another example, the NC might be configured to look at where the unallocated nodes fell on the tolerance curve during STEPs 415 and 418, and choose the node or nodes closet to the tolerance curve for allocation.

The threshold for determining whether network activity allows additional allocations can be established using a variety of different parameters. For example, the NC might look at network loading for the current time slot, and if bandwidth is available, lower the threshold for determination. As another example, the NC might look at RRs already received from nodes for the next MAP cycle and adjust the threshold based on predicted loading. As yet another example, nodes of different services classes might have different latency-tolerance curves. Classes might depend on factors such as, for example, purchased level of service, knowledge of current traffic patterns and so on. As another example, in one embodiment, nodes that have registered with the system for, or are otherwise identified as getting, parameterized quality of service (pQoS) might be slated to get a predetermined or minimum number of reservations.

Note that for round-robin traffic from all nodes where every node is sourcing data and none are quiet, the scheduling algorithm might be configured to schedule RRs for all nodes in a round robin fashion as in FIG. 3 (for 8 nodes). For 16 nodes, the macro-cycle can be increased to 3 micro-cycles and RRs scheduled for every node in every macro-cycle. Of course, if every node is sourcing data and are all above their threshold, an algorithms such as that described above with reference to FIG. 4, for example, would result in a round-robin type of scheduling activity.

While various embodiments of the disclosed concepts have been described above, it should be understood that they have been presented by way of example only, and not of limitation. Likewise, the various diagrams may depict an example architectural or other configuration for the disclosed concepts, which is done to aid in understanding the features and functionality that can be included in the concept. Accordingly, the claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Figure 8:
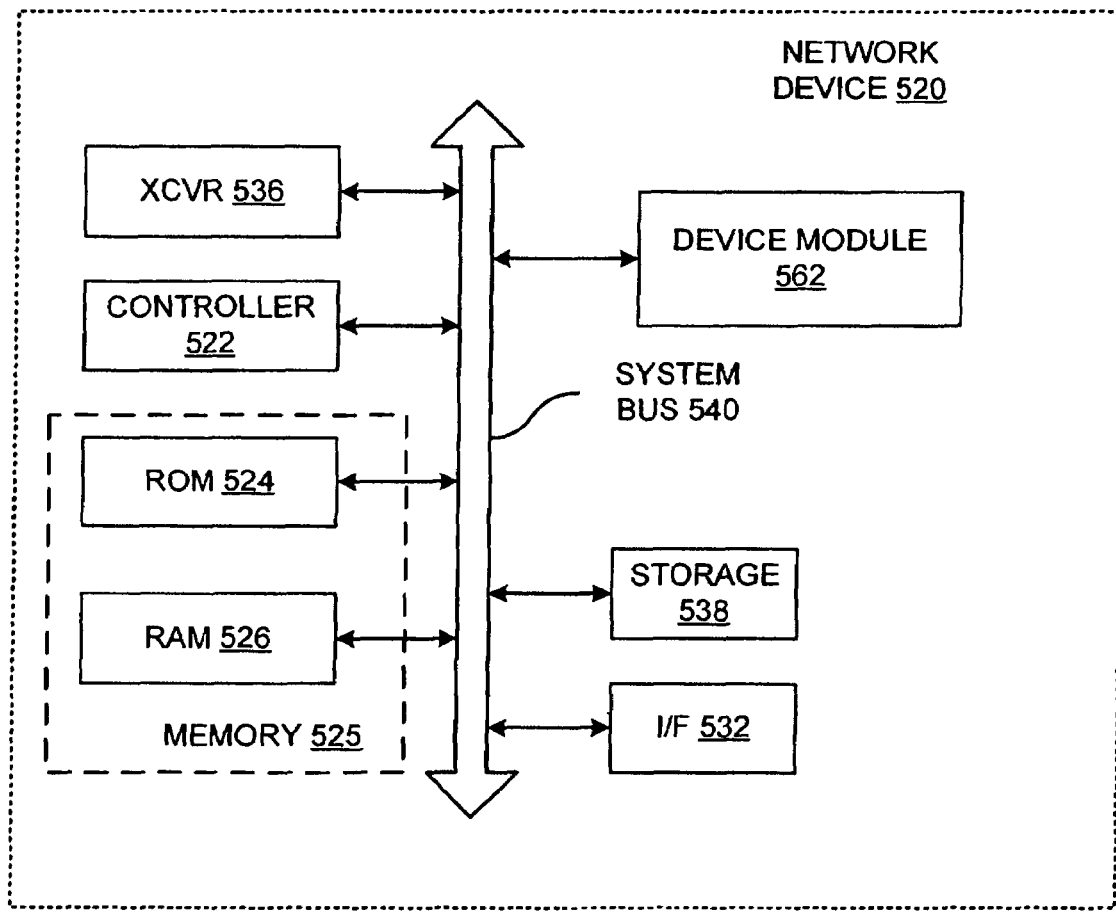
FIG. 8 is a diagram illustrating an example of a generalized architecture for a network device in accordance with one embodiment of the disclosed method and apparatus.

With MoCA and other network environments, the network nodes typically include a network device with a processor, controller or other processing module configured to perform device functions. The scheduling and other network management features discussed above might be performed by the device processing module, or a dedicated network module might be provided with the device to enable it to function as a network node. One example configuration of a network device that can be used with a communication network, such as the MoCA network is illustrated in FIG. 8. Referring now to FIG. 8, the example network device 520 includes a controller 522, memory 525 and a system bus 540.

Controller 522 might be implemented using a general-purpose or special-purpose processing engine such as, for example, a microprocessor, controller, or other control logic. In one embodiment, some or all of device 520 functionality can be implemented using an ASIC, PLD or other circuit device, including a processor core and memory blocks. Accordingly, controller 522 might be implemented using a processing core such as, for example, a RISC microprocessor core. Examples of RISC processor cores include ARM cores available from Advanced RISC Machines Ltd, located in Cambridge, England, and MIPS RISC cores available from MIPS Technologies, Inc., of Mountain View, Calif., although other cores are available as well. In the example illustrated in FIG. 8, controller 522 is connected to a bus 540 or other communication medium to facilitate interaction with other components of the device. Although a central bus structure is depicted, other communication media and architectures are acceptable.

Controller 522 operates to execute program code that would typically be stored, for example, in ROM 524, and generally controls the functionality for the network device. RAM 526 can also be included to serve as working memory for controller operations and other storage. Network device 520 may further include secondary storage devices 538, such as but not limited to hard drives, floppy drives, CD and DVD ROM and RWM drives, removable memory or storage devices.

For external communications, the network device can also include communications capabilities. For instance, the example illustrated in FIG. 8 includes a network transceiver 536 and an external interface 532. As a practical example, in the case of the example environment, network transceiver 536 could be a MoCA transceiver that enables the device to share data with other MoCA nodes.

The communications interfaces might also be used to allow software and data to be transferred between network device 520 and other devices or nodes. Examples of communications interface might include a modem or softmodem, a network interface (such as an Ethernet, network interface card, WiMedia, 802.11, MoCA or other interface), a communications port (such as for example, a USB port, IR port, RS232 port Bluetooth interface, or other port), or other communications interface. Software and data transferred via communications interfaces might typically be carried on signals, which can be electronic, electromagnetic, optical or other signals capable of being exchanged by a given communications interface. These signals might be provided to communications the interface via a compatible channel, which might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory or storage units, storage media, and signals on channel. These and other various forms of computer media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions can enable the device to perform features or functions as discussed herein.

Device module 562 is a black-box representation of the functionality that can be performed by the network device 520 and that may vary depending on that the nature of the actual device. For example, assume that network device 520 in this example is a digital video camera. In this implementation, device module 562 might include imaging optics, an image sensor, image buffers, and other like functionality. Device module 562 can further include processing and memory capabilities, or can use controller 522, and memory 525 for some or all of its operational abilities. As this example illustrates, network device 520 might be implemented as other devices having other components, configurations or functionality.

As used herein, the term module might describe a given unit of functionality that can be performed. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Although the concepts are described above in terms of various embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments consistent with the disclosed concepts, whether or not such embodiments are described and whether or not such features are presented as being a part of a described embodiment. Thus, the breadth and scope of the claimed invention should not be limited by any of the above-described embodiments, but rather will find support from the disclosure to the full extent of the concepts exemplified by the disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide selected instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components disclosed may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described as examples of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for scheduling reservation requests among a plurality of nodes on a network, comprising:
   a network device examining a level of network communication activity of a first node to determine a level of communication activity of the first node over one or more previous cycles and to determine a number of cycles since the first node has been allocated a reservation request; and
   the network device determining whether to allocate a reservation request to the first node based upon the determined level of communication activity of the first node as a function of the determined number of cycles since the last allocation of a reservation request.

2. The method of claim 1, further comprising:
   the network device examining a level of network communication activity of a second node in the network to determine a level of communication activity of the second node over one or more previous cycles and to determine a number of cycles since the second node has been allocated a reservation request; and
   the network device determining whether to allocate a reservation request to the second node based upon the determined level of communication activity of the second node as a function of the number of cycles since the last allocation of a reservation request.

3. The method of claim 1, wherein determining the level of network communication activity of the first node comprises determining an amount of time elapsed since a previous network transmission by the first node.

4. The method of claim 1, wherein determining whether to allocate a reservation request to the first node comprises determining whether the first node has exceeded a threshold calculated as a function of a quiet time for the first node.

5. The method of claim 1, wherein determining whether to allocate a reservation request to the first node comprises determining whether the first node has exceeded a threshold calculated as a function of the last reservation request allocated for the first node.

6. The method of claim 1, further comprising allocating a reservation request to one or more of the plurality of nodes on the network regardless of whether the nodes are active.

7. The method of claim 1, wherein examining the level of network communication activity of the first node and determining whether to allocate a reservation request to the first node are repeated for each of the plurality of nodes on the network.

8. The method of claim 1, further comprising:
   allocating a reservation request to the first node based on the determination of the network device; and
   determining a subsequent level of network activity after allocating the reservation request to the first node; and
   making an additional reservation request allocation based on the subsequent level of network activity.

9. A network device, comprising:
   a controller;
   a device module;
   memory coupled to the controller;
   computer executable program code on a computer readable medium configured to cause the controller to perform the functions of:
   examining a level of network communication activity of a first node to determine whether the first node is active and to determine a number of cycles since the first node has been allocated a reservation request;
   determining whether to allocate a reservation request to the first node based upon the determination of whether the first node is active as a function of the determined number of cycles since the last allocation of a reservation request to the first node; and
   examining a level of network communication activity of a second node to determine whether the second node is active and to determine a number of cycles since the second node has been allocated a reservation request; and determining whether to allocate a reservation request to the second node based upon the determination of whether second node is active.

10. The network device of claim 9, wherein the function of determining the level of network communication activity of the first node comprises determining the amount of time elapsed or the number of cycles since a previous network transmission by the first node.

11. The network device of claim 9, wherein the function of determining whether to allocate a reservation request to the first node comprises determining whether the first node has exceeded a threshold calculated as a function of a quiet time for the first node.

12. The network device of claim 9, wherein the function of determining whether to allocate a reservation request to the first node comprises determining whether the first node has exceeded a threshold calculated as a function of the last reservation request allocated for the first node.

13. The network device of claim 9, wherein the computer executable program code is further configured to cause the controller to allocate a reservation request to a node on the network regardless of whether that node is active.

14. The network device of claim 9, wherein the functions of examining the level of network communication activity of the first node and determining whether to allocate a reservation request to the first node are repeated for each node on the network.

15. The network device of claim 9, wherein the computer executable program code is further configured to allocate reservation requests to the first and second nodes based on the determinations of the network device, and wherein the computer executable program code is further configured to cause the controller to determine a subsequent level of network activity after the first and second nodes have been allocated reservation requests, and wherein the computer executable program code is further configured to cause the controller to make an additional reservation request allocation determination based on the subsequent network activity.

16. A computer program product comprising a non-transitory computer readable medium having code embodied therein for performing resource allocation in a communication network, the code configured to cause a device to:

examine a level of network communication activity of a first node to determine whether the first node is active and to determine a number of cycles since the first node has been allocated a reservation request;

determine whether to allocate a reservation request to the first node based upon the determination of whether the first node is active as a function of the determined number of cycles since the last allocation of a reservation request to the first node; and examining a level of network communication activity of a second node to determine whether the second node is active and to determine a number of cycles since the second node has been allocated a reservation request; and determining whether to allocate a reservation request to the second node based upon the determination of whether the second node is active as a function of the determined number of cycles since the last allocation of a reservation request to the second node.

17. The non-transitory computer readable medium of claim 16, wherein the function of determining the level of network communication activity of the first node comprises determining the amount of time elapsed or the number of cycles since a previous network transmission by the first node.

18. The non-transitory computer readable medium of claim 16, wherein the function of determining whether to allocate a reservation request to a first node comprises determining whether the first node has exceeded a threshold calculated as a function of a quiet time for the first node.

19. The non-transitory computer readable medium of claim 16, wherein the function of determining whether to allocate a reservation request to the first node comprises determining whether the first node has exceeded a threshold calculated as a function of the last reservation request allocated for the first node.

20. The non-transitory computer readable medium of claim 16, wherein the computer executable program code is further configured to cause the device to allocate a reservation request to a node on the network regardless of whether that node is active.

21. The non-transitory computer readable medium of claim 16, wherein the functions of examining the level of network communication activity of the first node and determining whether to allocate a reservation request to the first node are repeated for each node in the network.

22. The non-transitory computer readable medium of claim 16, wherein the computer executable program code is further configured allocate a reservation request to the first and second nodes based on the determinations of the network device, and wherein the computer executable program code is further configured to cause the device to determine a subsequent level of network activity after the first and second nodes have been allocated reservation requests, and wherein the computer executable program code is further configured to make an additional reservation request allocation based on network activity.

23. A network interface module, comprising:
a controller;
memory coupled to the controller;
computer executable program code on a computer readable medium configured to cause the controller to perform the functions of:
examining a level of network communication activity of a first node to determine whether the first node is active and to determine whether a number of cycles since the first node has been allocated a reservation request;
determining whether to allocate a reservation request to the first node based upon the determination of whether the first node is active as a function of the determined number of cycles since the last allocation of a reservation request to the first node; and
examining a level of network communication activity of a second node on the network to determine whether the second node is active and to determine a number of cycles since the second node has been allocated a reservation request; and
determining whether to allocate a reservation request to the second node based upon the determination of whether the second node is active as a function of the determined number of cycles since the last allocation of a reservation request to the second node.

24. The network interface module of claim 23, wherein the function of determining whether to allocate a reservation request to the first node comprises determining the amount of time elapsed or the number of cycles since a previous network transmission by the first node.

25. The network interface module of claim 23, wherein the function of determining whether to allocate a reservation request to the first node comprises determining whether the first node has exceeded a threshold calculated as a function of a quiet time for the first node.

26. The network interface module of claim 23, wherein the function of determining whether to allocate a reservation request to the first node comprises determining whether the first node has exceeded a threshold calculated as a function of the last reservation request allocated for the first node.

27. The network interface module of claim 23, wherein the computer executable program code is further configured to cause the controller to allocate a reservation request to a node on the network regardless of whether that node is active.

28. The network interface module of claim 23, wherein the functions of examining the level of network communication activity of the first node and determining whether to allocate a reservation request to the first node are repeated for each node on the network.

29. The network interface module of claim 23, wherein the computer executable program code is further configured to cause the controller to allocate reservation requests to the first and second nodes based on the determinations of the network interface module, and wherein the computer executable program code is further configure to cause the controller to determine a subsequent level of network activity after the first and second nodes have been examined and have been allocated reservation requests, and wherein the computer executable program code is further configured to cause the controller to make an additional reservation request allocation based on the subsequent network activity.

* * * * *